United States Patent [19]
Moffatt

[11] 3,863,505
[45] Feb. 4, 1975

[54] VIBRATING CYLINDER PRESSURE TRANSDUCER

[75] Inventor: E. Marston Moffatt, Glastonbury, Conn.

[73] Assignee: United Aircraft Corporation, East Hartford, Conn.

[22] Filed: July 9, 1973

[21] Appl. No.: 377,868

[52] U.S. Cl. ............................................. 73/398 R
[51] Int. Cl. ............................................. G01l 9/10
[58] Field of Search ............ 73/398 R, 398 C, 67.2, 73/53, 32 A

[56] References Cited
UNITED STATES PATENTS
3,021,711  2/1962  Arvidson ........................ 73/398 R
3,327,533  6/1967  Kooiman ........................ 73/398 R

*Primary Examiner*—Donald O. Woodiel
*Attorney, Agent, or Firm*—M. P. Williams

[57] ABSTRACT

A vibrating cylinder pressure transducer has magnetic drive and pick up coils disposed in a non-magnetic cylindrical wall outside of the vibrating cylinder, all wires leading to and from the magnets being outside of the pressure chambers all together, whereby the interior of the vibrating cylinder is readily provided with a hermetic seal so as to provide an annular pressure chamber outside the vibrating cylinder, the inside of the vibrating cylinder being evacuated and the annular chamber being connected to a fluid source, the absolute pressure of which is to be measured. In one embodiment, a three lobe (six node) vibration mode is rendered possible by providing electromagnets (either the drive pair or the sense pair) at an angle of 120° with respect to each other, the other pair being operated out of phase, diametrically opposite each other and along the bisector of the first pair.

19 Claims, 7 Drawing Figures

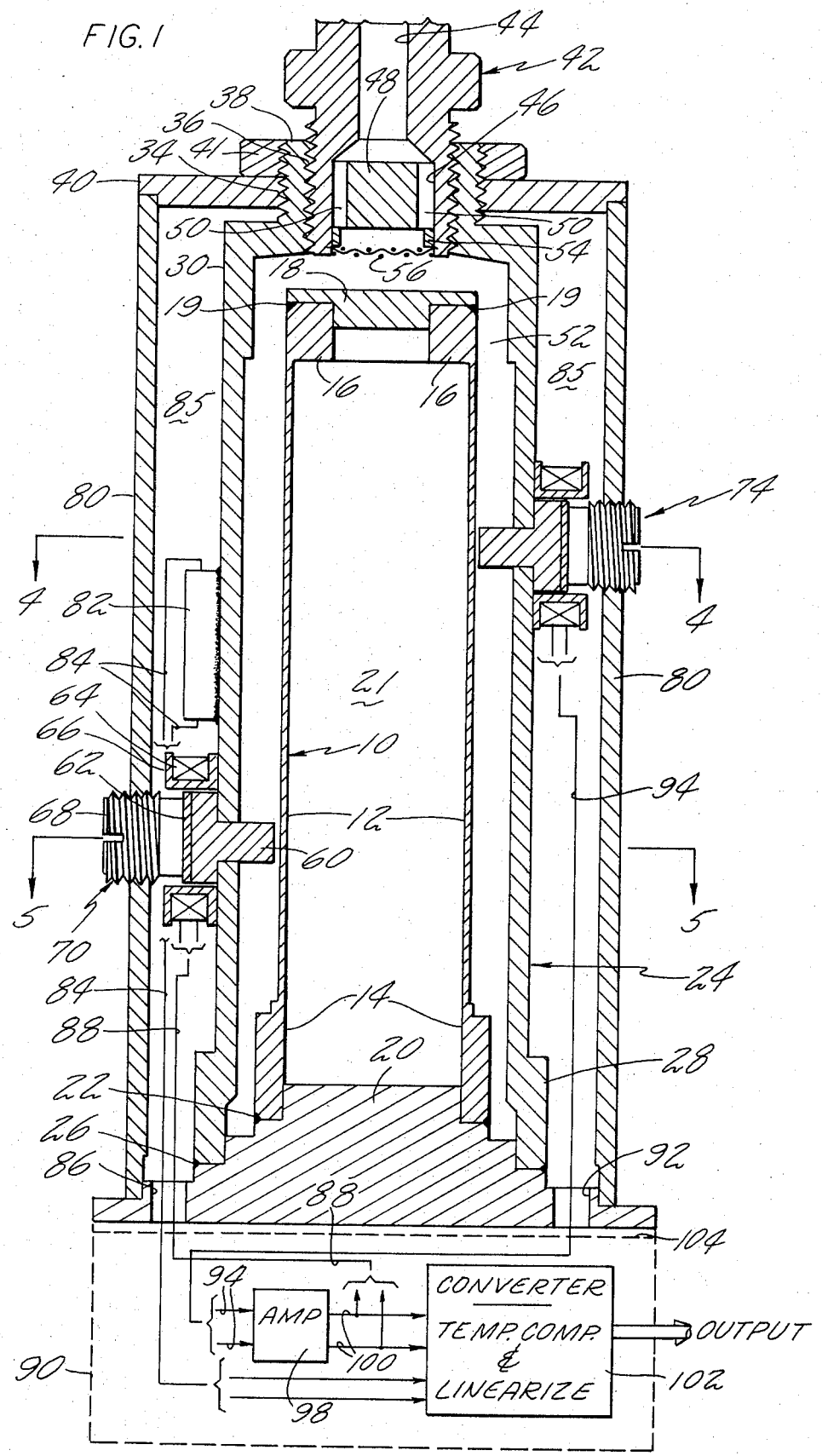

VIBRATING CYLINDER PRESSURE TRANSDUCER

BACKGROUND OF THE INVENTION

1. Field of Invention

This invention relates to vibrating cylinder pressure transducers, and more particularly to improvements therein which facilitate hermetic sealing, high pressure embodiments, and ease of manufacture and repair.

2. Description of the Prior Art

A vibrating cylinder pressure transducer which has found some acceptance in the art is disclosed in Arvidson U.S. Pat. No. 3,021,711. This transducer has an electromagnet mounting spool or member disposed within the vibrating cylinder, upon which are mounted a single diametric drive electromagnet and a single diametric sensing electromagnet, the electromagnets being mutually perpendicular and both transverse to the axis of the cylinder. A necessary correlary is that the electrical wires which interconnect the electromagnet with amplifying and other circuitry external of the device are coupled through the spool member to the outside world. This renders it difficult if not impossible to provide a suitable hermetic seal within the vibrating cylinder such that the vibrating cylinder may be operated with internal pressures which are much smaller than those of the ambient. Not only do the wires themselves require passages that be sealed on a wire-by-wire basis, the wires are normally provided with organic insulation which itself is inherently difficult to provide a hermetic seal against, particularly over long periods of time. It is thus difficult if not impossible to operate the device with a vacuum within the vibrating cylinder, rendering it difficult or impossible to operate the device in a compression mode (in which the pressure outside of the cylinder exceeds that inside the cylinder).

Additionally, since single drive and single sense electromagnets are provided, it is impossible to provide three lobe (six node), or other odd lobe modes of vibration. Thus when high pressures are involved, necessitating a thicker cylinder wall to sustain the higher pressure, the resulting change in the desired mode for maximum pressure sensitivity is frequently incapable of being accommodated.

Further, because the electomagnets are firmly disposed within the mounting spool, such as by plastic or other potting, once they are formulated therein, it is impossible to repair or replace them without substantial destruction of the entire device.

An additional problem is that it is difficult to provide a gas under pressure to the inside of the vibrating cylinder, since small, torturous-route passages must be provided, which impede the flow of the pressurized gas, and which have a tendency to become blocked or plugged, and thereby render the device less reliable and accurate. However, since a vacuum is difficult to establish within the vibrating cylinder as described hereinbefore, the use of such a device as an absolute pressure monitor requires that the fluid under test be applied to the center of the cylinder.

SUMMARY OF INVENTION

The principal object of the present invention is to provide significant improvements in vibrating cylinder pressure transducers.

According to the present invention, a vibrating cylinder pressure transducer has drive means and sensing means, which may comprise electromagnets, disposed in an outer cylinder which surrounds and is hermetically sealed with respect to the vibrating cylinder. In accordance further with the present invention, the improved vibrating cylinder pressure transducer according to the present invention may be provided with either or both of the drive or sensing means disposed so as to promote odd-lobe vibratory modes.

In still further accord with the present invention, a temperature sensing element is bonded midway along an external wall of the outer cylinder thereby to provide a direct measure of the temperature of the transducer for utilization and control of temperature compensation of the output thereof.

The present invention permits complete hermetic sealing of the interior of the vibrating cylinder. The invention permits ready access, without the breaking of a hermetic seal, to the drive and sensing means, such as electromagnets, for adjustment, replacement or repair. The invention avoids the necessity of passing electrical wires through any hermetic seals, thereby facilitating hermetic sealing throughout.

Because the invention really permits hermetic sealing of the interior of the vibrating cylinder, it supports the utilization thereof with substantially total vacuum inside of the cylinder, whereby the cylinder may be operated as an absolute pressure sensor operating in a compressive mode. This in turn facilitates choice of design frequency to avoid cross over of modes as a function of pressure, which in turn provides a total operating profile across a design pressure range without discontinuities in the response thereto.

The inlet of a vibrating cylinder pressure transducer in accordance herewith is readily provided with a magnetic trap and a screen so as to filter out contaminants which might otherwise enter the transducer from the source of pressure being measured thereby. The invention promotes use of free-flow inlets to the pressure chambers thereof.

By eliminating the narrow spool for supporting electromagnets within the cylinder, the present invention not only eliminates a source of mechanical vibration errors, but also eliminates the constraint on size of the vibrating cylinder. Since electromagnets disposed outside of the cylinder can be of any size, and can be disposed on a mount which is any size, the vibrating cylinder may be of a small diameter, thereby to render it operable at higher frequencies, in turn to be less susceptible to low frequency vibration noise. External mounting of the electromagnets permits rendering the outer pressure cylinder which mounts the magnets to be of a desired diameter, utilizing pole pieces to transcend the distance between the outer pressure cylinder and the vibrating cylinder, whereby the size of the outer pressure cylinder which mounts the magnets can be chosen with respect to inducement of vibratory noise and other factors. Thus the present invention can inherently be rendered less sensitive to errors as a result of vibration.

The invention facilitates long, reliable operation by providing for traps at the inlet thereto. The invention further renders the achievement of temperature compensation practical by the inclusion of temperature sensing means at a point therein which is responsive to the operating temperature of the device, without the necessity of breaking through of hermetic seals, or other interference with the vibratory operation of the device.

The foregoing and various other features and advantages of the present invention will become more apparent in the light of the following detailed description of a preferred embodiment thereof, as illustrated in the accompanying drawing.

BRIEF DESCRIPTION OF THE DRAWING

FIG. 1 is a sectional side elevation view and schematic circuit illustration of a preferred embodiment of the present invention;

DESCRIPTION OF THE PREFERRED EMBODIMENT

Figure 4:
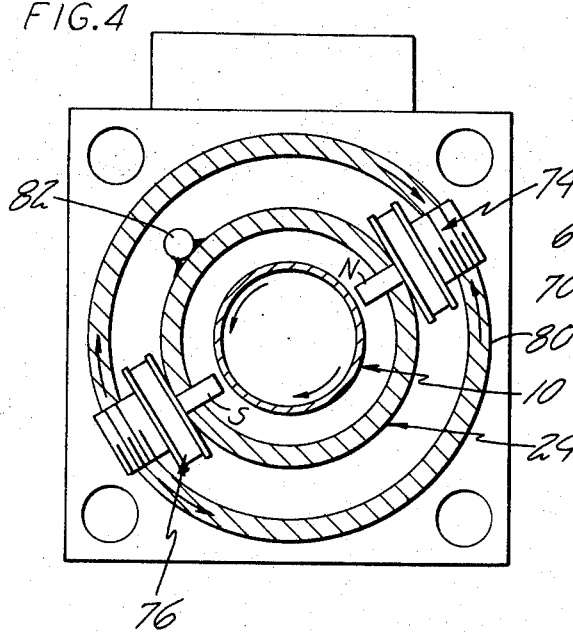
FIG. 4 is a sectional plan view taken on the line 4—4 in FIG. 1.

Referring now to FIG. 1, a vibrating cylinder pressure transducer in accordance with the present invention comprises a vibrating cylinder 10 including a cylindrical thin cylindrical wall 12 which is preferably formed of a steel having a low temperature coefficient of elasticity, such as Ni-Span-C stainless steel. The lower end of the cylinder 10 has a thickened cylindrical portion 14 which isolates the vibratory node at the base of the thin shell portion from the base of the transducer, to eliminate damping which results from joints in the metal. The upper end of the cylinder 10 includes a thickened cylindrical portion 16 which provides assurance of a vibratory node at the end of the cylinder 10 vibrationally isolated from the joint with a hermetically sealed cap 18 fixed thereto in some suitable fashion such as by an annular weld 19.

The vibrating cylinder 10 is hermetically sealed, such as by an annular weld 22, thereby to form a chamber 21, to a base 20 to which a non-magnetic outer pressure cylinder 24 may also be hermetically sealed, such as by means of an annular fillet weld 26, between the base 20 and an enlarged lower cylindrical portion 28 of the outer pressure cylinder 24. The upper end of the outer pressure cylinder 24 may comprise an enlarged cylindrical portion 30, since there is no vibration of the cylinder 10 in the upper region surrounding the enlarged portion thereof at 16. An upper surface 32 of the cylinder extends radially inwardly, and is provided with external threads 34 and internal threads 36 within an upward cylindrical extension 38 thereof. The external threads 34 mate with internal threads on a magnetic shield cover plate 40, and a lock nut 41, and the internal threads 36 engage the threads of an inlet means 42. The inlet means may contain a central bore 44 which comprises a conduit for fluid communication with a source of fluid (not shown), the pressure of which is to be monitored by the transducer. The bore 44 is in communication with a substantially larger bore 46 within which is disposed a magnet 48, which may be in the form of a right cylinder having flattened sides, the flattened sides providing passageways 50 for fluid to extend from the bore 44 to an annular chamber 52 between the vibrating cylinder 10 and the outer pressure cylinder 24. Within the bore 46, an annular spacer 54 (such as a washer) ensures that a screen 56 will not make contact with the magnet 48, thereby ensuring a free flow of fluid from the bore 44 to the chamber 52. The magnet 48 attracts magnetized particles, and the screen 56 prevents the passage of other particles into the chamber 52, thereby ensuring reliable and accurate operation of the transducer.

Figure 5:
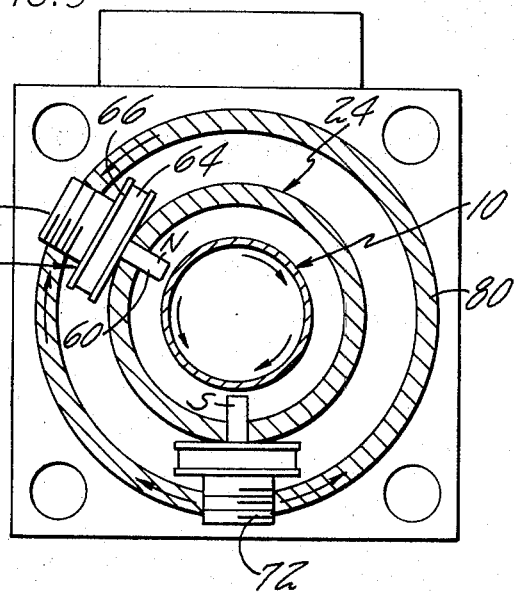
FIG. 5 is a sectional plan view taken on the line 5—5 in FIG. 1.
Figure 2:
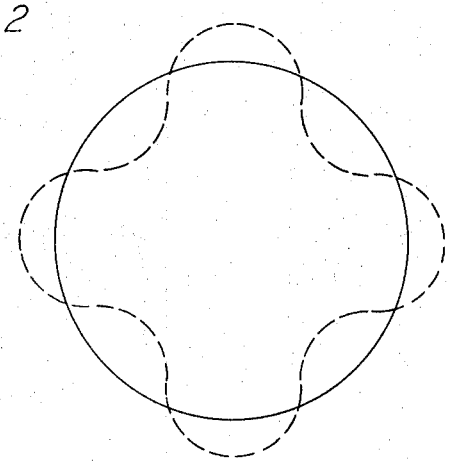
FIG. 2 is a schematic illustration of a four lobe (eight node) vibratory mode.
Figure 3:
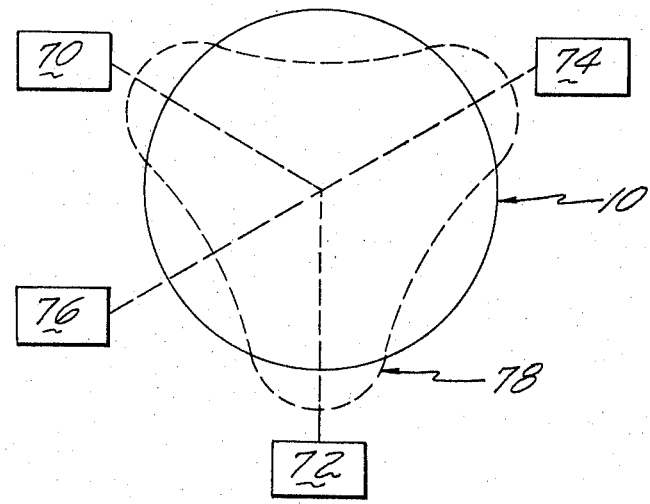
FIG. 3 is a schematic illustration of a three lobe (six node) vibratory mode.

A high permeability magnetic pole piece 60, which may be generally cylindrical in nature and have an enlarged outer flanged portion, is disposed through a hole in the wall of the outer pressure cylinder 24. The pole piece 60 is of a reduced size adjacent to the cylinder 10 in order to minimize fluid damping which is a function of the area of the end of the pole piece; the enlarged portion reduces reluctance of the magnetic path. This conducts magnetic flux to the vibrating cylinder 10 through the pressure chamber 52. Disposed adjacent the pole piece 60 is a permanent magnet, which may preferably comprise an Alnico magnet 62. The magnet 62 is preferably thin, and of a cylindrical nature. The magnet 62 provides magnetic bias to the pole piece 60, whereby only alternating current (without D.C. bias) need be applied to the coil 64 in order to provide oscillatory magnetic flux through the pole piece 60 thereby to induce vibrations in the vibrating cylinder 10. Surrounding the magnet 62 and the pole piece 60 is a solenoid wound magnetic coil 64 disposed in a spool type core 66. The pole piece 60, the magnet 62 and the core 66 may be suitably bonded, such as by cement, to each other so that the pressure of a compression screw 68 against the magnet 62 will hold the entire assembly rigidly against the outer pressure cylinder 24. The magnetic elements 60–68 comprise a drive electromagnet 70. As seen in FIG. 5, there is a second drive electromagnet 72, similar in construction to the drive electromagnet 70, disposed at an angle of 120° with respect to the drive electromagnet 70. It should be noted that the position of the drive electromagnet 70 is rotated somewhat in FIG. 5 from the position in which it is shown in FIG. 1. As seen in FIG. 1, there is a sense electromagnet 74, similar in construction to the drive electromagnet 72, except for the fact that it has more turns thereby to have greater sensitivity. As is seen in FIG. 4, the sense electromagnet 74 is disposed radially opposite, or diametric with respect to a second sense electromagnet 76. The electromagnets 74, 76 are on a diameter of the cylinders 10, 24 which forms the bisector of the angle between the drive electromagnets 70, 72 (FIG. 5). The purpose for this is illustrated with respect to FIG. 3 wherein the vibrating cylinder 10 is denoted by a solid line, and a dotted line 78 denotes a three lobe (six node) vibratory mode which may be induced with the electromagnets 70–76 disposed as shown in FIGS. 4 and 5. Thus the drive magnets 70, 72 are operated in phase with one another (so that each attracts or releases the magnetic vibrating cylinder 10 at the same instant), but the sense magnets 74, 76 are operated out of phase with one another such that the voltages induced therein can be subtracted one from the other in a differential fashion, while at the same time providing for an odd-lobe vibratory mode which in FIG. 3 is three lobe (six node). This arrangement also ensures full cancellation of the driving magnetic flux from both of the sensing electromagnets 74, 76 since these are disposed symmetrically with respect to the drive electromagnets 70, 72, and due to the symmetrical driving of the electromagnets 70, 72, any direct coupling is opposite and cancels. This is a specific feature of the present invention which is permitted by means of utilization of pairs of drive and sense electromagnets 70–76 in contrast with the unitary drive and sense electromagnets of the Arvidson patent, which promote only even-lobe vibratory modes, such as the four lobe (eight node) mode illustrated in FIG. 3 herein.

In FIG. 1, the compression screw 68 is threadably received in an outer magnetic shield cylinder 80 disposed between the magnetic shield cover plate 40 and the base 20 of the transducer. The shield cylinder 80 and the plate 40, the compression screw 68 and core 66, the pole piece 60 (and similar parts of the other electromagnets 72–76), and the base 20 of the transducer are preferably formed of a high permeability metal, such as Allegheny Ludlum 4750 nickel steel, which provides complete magnetic shielding not only for the magnetic circuits of the electromagnets 70–76, but also for the vibrating cylinder 10. The magnetic path for driving the cylinder includes one pole piece 60, the circumference of cylinder 10, the pole piece of electromagnet 72, and the circumference of cylinder 80, as shown in FIG. 5; the cylinder 24 is of nonmagnetic steel, such as 18-8 stainless. This is achieved by magnetizing the pole pieces in an opposite sense, as shown in FIG. 5. This is achieved by permanent magnetization of the magnets (62), or by supplying a D.C. bias to the drive, the drive therefore always provides flux in the same direction, varying about an average flux. The magnets of the sense electromagnets 73, 74 are magnetized in opposite directions to similarly ensure circumferential flux paths.

A temperature sensor 82, which may preferably comprise a forward-biased junction diode or other known sensor, is bonded, such as by cement, or in some other suitable fashion, to an outer wall of the outer pressure cylinder 24, approximately midway along the length thereof. The temperature sensor, without any interference whatsoever with the seal in the outer pressure chamber 52 or the chamber formed within the vibrating cylinder 10, provides an accurate measure of the temperature of the transducer, which permits simplification of temperature compensation of the output of the transducer. A pair of conductors 84 connected to opposite ends of the temperature sensor 82 pass freely in a void space 85 between the electromagnetic shield cylinder 80 and the outer pressure cylinder 24, through an aperture 86 in the base 20, and to external circuitry 90, similarly, a pair of conductors 88 interconnect the series-connected drive electromagnets 70, 72 with the circuitry 90. Additional apertures (such as the aperture 92 shown to the right in FIG. 1) are provided to permit other electrical connections with the circuitry 90, such as a pair of wires 94 from the series-connected sense electromagnets 74, 76. The sense electromagnets are connected by the electrical leads 94 to an amplifier 98 which has a frequency response at least as broad as the frequency range required for the design pressure range of the transducer, the output of which, on electrical connections 100, is applied to the electrical conductors 88 for the drive electromagnets 70, 72. The output on electrical connections 100 may also be applied to an output conversion means 102 for converting the frequency of the amplifier output to a digital output, and which may include temperature compensation responsive to the temperature indicated by signals on the electrical conductors 84 from the temperature sensor 82, and which may include linearization of the output thereby to provide, on output connections 106, a temperature-compensated, linearized output which is substantially accurate over a design temperature range of the apparatus. The circuitry 90 is within the skill of the art and forms no part of the present invention, and is illustrative merely to indicate interconnections of the transducer with external circuitry. The circuitry 90 may preferably be disposed remotely from the transducer, and the mounting base 104 of the transducer per se may contain interconnection pins for a harness to interconnect the transducer with the circuitry 90. As is known, the signals at the output 106 of the transducer may be utilized to drive any suitable indication of the pressure being sensed, or may be used, with or without further amplification and modification, to control some utilization apparatus as a function of pressure sensed by the transducer.

Figure 6:
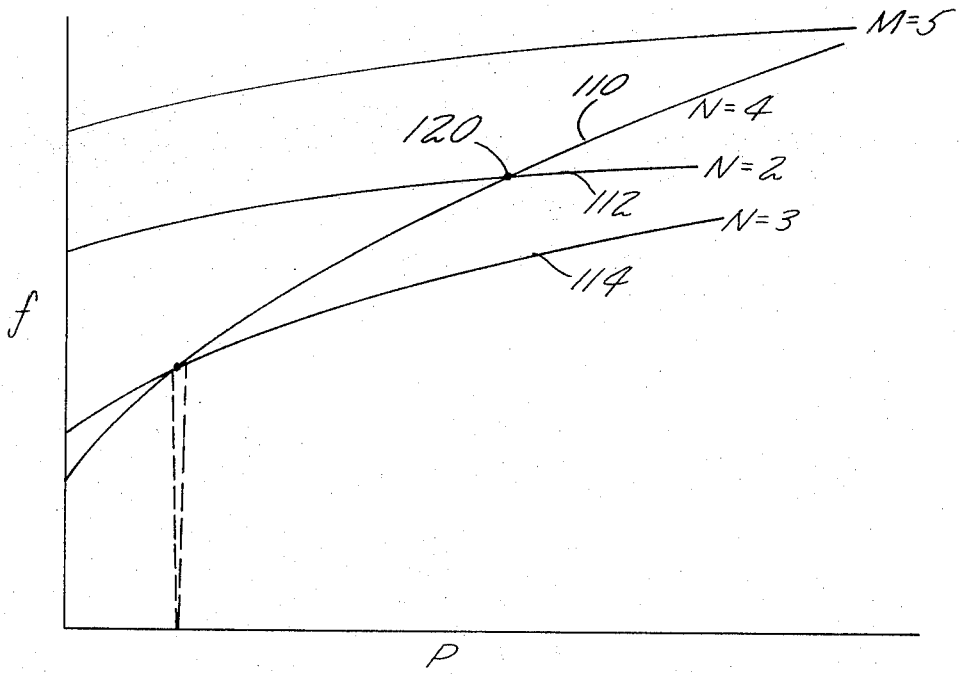
FIG. 6 is an illustration of cylinder frequency response in tension modes.
Figure 7:
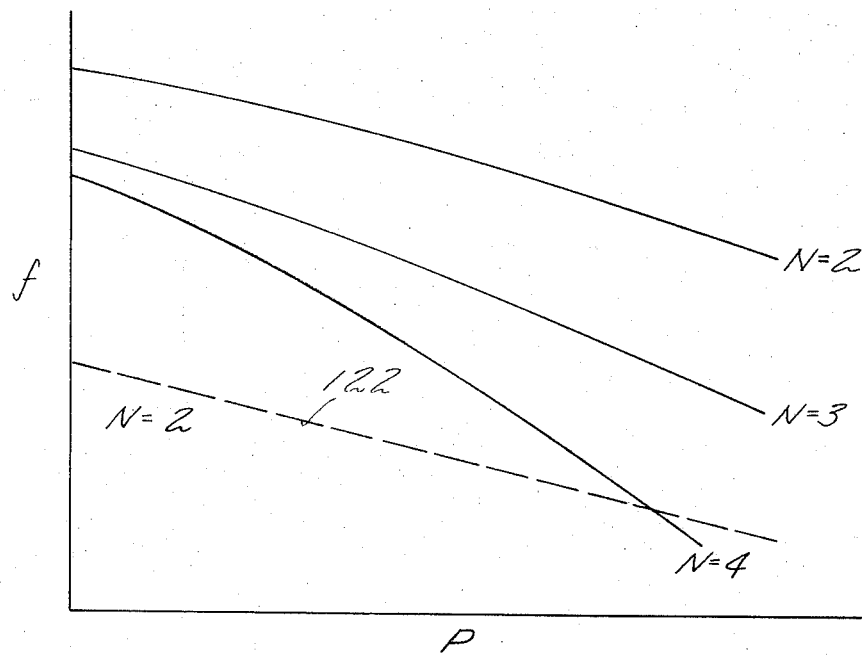
FIG. 7 is an illustration of cylinder frequency response in compression modes.

Although the invention has the advantage that the inside of the vibrating cylinder 10 may readily be hermetically sealed, thereby to support an absolute vacuum for a relative pressure transducer, it is apparent that the provision of the relatively simple base 20, without any electrical connections passing therethrough (in contrast with the aforementioned Arvidson patent) also permits a free flow entry of a fluid under pressure into the chamber 21 within the vibrating cylinder 10, thereby to permit reading differential pressures. Since the chamber 21 is equally operable at any design pressure as is the chamber 52, and since a straight, unimpeded access can be made to either of these chambers, the present invention also provides an improved differential pressure sensor, and provides the ability to operate effectively either with the vibrating cylinder in compression (the pressure inside the cylinder being lower than that outside) or with the cylinder 10 in tension (the pressure inside the cylinder 10 being greater than the pressure outside the cylinder 10). This permits a greater flexibility of design so as to suit the operating parameters of any given pressure transducer in accordance with the present invention. For instance, FIG. 6 illustrates a family frequency response as a function of temperature for different vibratory modes. For instance, a four lobe vibratory mode ($n=4$) is illustrated by the line 110, a two lobe vibratory mode ($n=2$) is illustrated by the line 112, and a three lobe vibratory mode ($n=3$) is illustrated by the line 114. In order to get maximum sensitivity, in a transducer having the characteristics across the pressure range illustrated in FIG. 6, it is normal to choose the four-lobe vibratory mode illustrated by the line 110 since it has the greatest slope, and therefore provides the greatest sensitivity (frequency versus pressure) of the three modes illustrated. However, it can be seen that the mode 110 crosses the three-lobe mode 114 at a point 116, and this causes eratic operation at that pressure, and may in fact result in a total loss of vibration, so that the frequency may in fact be reduced to zero at that point, as illustrated by the dotted lines 118. Similarly, at the point 120, the four-lobe mode may cross the two-lobe mode, causing an additional point of eratic operation at which the frequency may go to zero, or there may be other discontinuities in the sensitivity of the device. This illustrates a device which is operated under tension. On the other hand, FIG. 7 illustrates a device operating under compression, and it is easily seen that the four-lobe mode may be chosen so as to avoid conflict with the other two modes. Even though, as is shown by a dotted line 122, an alternative two-lobe mode may cross the four-lobe mode, it is usually quite easy to design the device so as to suppress the two-lobe mode illustrated by the line 122, thereby to provide for four-lobe mode operation without any interference whatsoever. This form of operation may be particularly useful where wide pressure ranges are desired. Thus, FIG. 7 illustrates that compressive operation (which is permitted by the design of the present invention but is difficult to achieve with the poor hermetic seals possible in the design of the Arvidson patent), can be advantageous. On the other hand, operation in tension may be advantageous in order to avoid buckling of the cylinder if the transducer under design is likely to be operated in an environment where the actual pressure applied thereto may exceed the design pressure by more than 100 percent. This is due to the fact that devices operated in tension typically can endure 20 to 50 times the design pressure without failure (which causes permanent creases along the nodes of the vibratory modes), but devices operated under compression may buckle with only twice the design pressure applied thereto. Thus, although compression is extremely useful at high pressure (where the likelihood of still further high pressure in excess of 100 percent is unlikely) may be most advantageous, utilization of tension at low pressure environments may be desirable, where the need for wide pressure differentials without interference between modes is not apparent and the likelihood for a high pressure excess is greater. The invention readily accommodates operation in both tension and compression.

In certain pressure ranges, it may be essential to use an odd-lobe mode (such as three lobe, six node) in order to avoid the mode interference just described. Thus, the dual electromagnet, electromagnetic drive means (and sense means) of the invention provides additional design capability. A plurality of drive means and a plurality of sense means are thus capable of a wide variety of configurations, to support various odd-lobe and even-lobe modes of operation not obtainable in the prior art.

In the event that other than a vacuum is desired in the chamber 11 within the vibrating cylinder 10, access may be had thereto by a simple conduit connection similar to the inlet means 42, without fear of any interference by wires or other apparatus (as is true in the case of a design following the teachings of Arvidson, hereinbefore).

One great advantage of the present invention, as is readily seen with reference to FIGS. 1, 4 and 5, is that the outer magnetic shield cylinder 80 can simply be screwed or otherwise removably fashioned to the base 20, without any need for a seal whatsoever. Since this shield 80 can be easily removed, after the compression screw 68 and similar screws are unthreaded therefrom, it is seen that it is a relatively simple matter to provide access to all of the electromagnets 70–72 for adjustment, repair or replacement. This is a decided advantage over the arrangements of the prior art.

Thus although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. A vibrating cylinder pressure transducer subcombination comprising:
   a base member;
   a vibrating cylinder composed of material having magnetic permeability, closed at one end and disposed in pressure sealing relationship against said base member at the other end thereof to form a first pressure chamber;
   an outer pressure cylinder composed of a substantially low magnetic permeability material, and at least partially closed at one end and disposed in pressure sealing relationship against said base member and surrounding said vibrating cylinder to form a second pressure chamber between said vibrating cylinder and said outer pressure cylinder;
   inlet means provided for one of said chambers so as to provide fluid communication between one of said chambers and a source of fluid, the pressure of which is to be measured by said transducer;
   electromagnetic drive means disposed on said outer pressure cylinder and in driving relationship with said vibrating cylinder;
   electromagnetic sensing means disposed on said outer pressure cylinder and in sensing relationship with said vibrating cylinder; and
   low reluctance magnetic path means disposed externally of said outer pressure cylinder for providing a return path for magnetic flux through said electromagnetic means and said vibrating cylinder.

2. A vibrating cylinder pressure transducer subcombination according to claim 1 wherein said drive means comprise a plurality of electromagnets spaced about the periphery of said outer cylinder.

3. A vibrating cylinder pressure transducer subcombination according to claim 2 wherein said drive means comprise an even number of electromagnetics, a first half of which provide an average magnetic flux to said vibrating cylinder of one polarity and the second half of which provide an average magnetic flux to said vibrating cylinder of a polarity opposite to that of said first half.

4. A vibrating cylinder pressure transducer subcombination according to claim 1 wherein said sense means comprise a plurality of electromagnets spaced about the periphery of said outer cylinder.

5. A vibrating cylinder pressure transducer subcombination according to claim 4 wherein said drive means comprise an even number of electromagnetics, a first half of which provide an average magnetic flux to said vibrating cylinder of one polarity and the second half of which provide an average magnetic flux to said vibrating cylinder of a polarity opposite to that of said first half.

6. A vibrating cylinder pressure transducer subcombination according to claim 1 wherein said drive means comprises a group of electromagnets, said sensing means comprises a group of electromagnets, and the electromagnets in one group of said grorups of electromagnets are spaced from each other by an angle of less than 180°.

7. A vibrating cylinder pressure transducer subcombination according to claim 6 wherein the electromagnets of the other of said groups of electromagnets are disposed substantially symmetrically with respect to said first group of electromagnets, thereby cancelling magnetic fields induced in said electromagnetic sensing means by said electromagnetic drive means.

8. A vibrating cylinder pressure transducer subcombination according to claim 7 wherein the electromagnets of said one group of electromagnets are disposed to permit operation with odd-lobe vibratory modes.

9. A vibrating cylinder pressure transducer subcombination according to claim 1 wherein said drive means comprises a group of electromagnets, said sensing means comprises a group of electromagnets, and the electromagnets in one group of said groups of electromagnets are spaced from each other by an angle which is not an integer multiple of 90°.

10. A vibrating cylinder pressure transducer subcombination according to claim 1 wherein said electromagnetic drive means comprises a pair of electromagnets, said electromagnetic sensing means comprises a pair of electromagnets, one of said pair of electromagnets being spaced from each other by an angle which is not an integer multiple of 90°, the other of said pair of electromagnets being disposed substantially symmetrically with respect to said first pair of electromagnets, thereby to permit operation with odd-lobe vibratory modes while cancelling magnetic fields induced in said electromagnetic sense means by said electromagnetic drive means.

11. A vibrating cylinder pressure transducer subcombination according to claim 1 wherein said low reluctance path means comprises a magnetic shield cylinder disposed radially outward of said outer pressure cylinder, and at least partially closed at one end and circumscribing a substantial portion of said base member at the other end, said base member and said magnetic shield cylinder being comprised of a high magnetic permeability material, whereby said shield cylinder and said base member provide substantially complete magnetic shielding for said electromagnets and said vibrating cylinder.

12. A vibrating cylinder pressure transducer subcombination according to claim 11 additionally comprising electronic temperature sensing means disposed on an outer surface of said outer pressure cylinder substantially midway along the axial length thereof, and electrical conductor means passing through said base member between said outer pressure cylinder and said magnetic shield cylinder to provide electrical communication from said electronic temperature sensing means to a point external of said magnetic shielding.

13. A vibrating cylinder pressure transducer subcombination according to claim 11 wherein said electromagnetic sense means and said electromagnetic drive means include electrical conductor means passing through said base member between said outer pressure cylinder and said magnetic shield cylinder to provide electrical communication from said electromagnetic means to a point external of said magnetic shielding.

14. A vibrating cylinder pressure transducer subcombination according to claim 1 wherein said base member is completely solid between the confines of the walls of said outer pressure cylinder.

15. A vibrating cylinder pressure transducer comprising:

a base member composed of a high magnetic permeability material;

a vibrating cylinder having magnetic permeability, closed at one end and disposed in pressure sealing relationship against said base member at the other end thereof to form a first pressure chamber, said vibrating cylinder composed of material having magnetic permeability;

an outer pressure cylinder at least partially closed at one end and disposed in pressure sealing relationship against said base member and surrounding said vibrating cylinder to form a second pressure chamber between said vibrating cylinder and said outer pressure cylinder, said outer pressure cylinder composed of a substantially low magnetic permeability material;

inlet means provided for one of said chambers so as to provide fluid communication between one of said chambers and a source of fluid, the pressure of which is to be measured by said transducer;

electromagnetic drive means disposed on said outer pressure cylinder and in magnetic communication with said vibrating cylinder;

electromagnetic sensing means disposed on said outer pressure cylinder and in magnetic communication with said vibrating cylinder;

a magnetic shield cylinder disposed radially outward of said outer pressure cylinder, and at least partially closed at one end and removably disposed with respect to said base member at the other end, said magnetic shield cylinder being composed of a high magnetic permeability material, whereby said shield cylinder and said base provide substantially complete magnetic shielding for said electromagnets and said vibrating cylinder; and circuit means interconnected between said electromagnetic sensing means and said electromagnetic drive means for providing electrical manifestations in response to magnetic variations induced in said electromagnetic sensing means by the vibrations of said vibrating cylinder for inducing electromagnetic force on said cylinder by said electromagnetic drive means, whereby said cylinder establishes self-induced oscillatory operation at a frequency dependent upon a pressure differential across the walls of said vibrating cylinder between said two chambers.

16. A vibrating cylinder pressure transducer according to claim 15 wherein said circuit means is disposed externally of said magnetic shielding and additionally comprising electronic temperature sensing means disposed on an outer surface of said outer pressure cylinder substantially midway along the axial length thereof, and electrical conductor means passing through said base member between said outer pressure cylinder and said magnetic shield cylinder to provide electrical communication between said electronic temperature sensing means and said circuit means.

17. A vibrating cylinder pressure transducer according to claim 15 wherein said circuit means is disposed externally of said magnetic shielding and wherein said electromagnetic sense means and said electromagnetic drive means include electrical conductor means passing through said base member between said outer pressure cylinder and said magnetic shield cylinder to provide electrical communication between said electromagnetic means and said circuit means.

18. A vibrating cylinder pressure transducer according to claim 15 wherein said base member is completely solid within said outer pressure cylinder.

19. A vibrating cylinder pressure transducer according to claim 15 wherein said electromagnetic drive means comprises a group of electromagnets, said electromagnetic sensing means comprises a group of electromagnets, and the electromagnets in one group of said groups of electromagnets are spaced from each other by an angle of less than 180°, the other group of said groups of electromagnets are disposed substantially symmetrically with respect to said first group of electromagnets, thereby to permit operation with odd-lobe vibratory modes while cancelling magnetic fields induced in said electromagnetic sense means by said electromagnetic drive means.

* * * * *